United States Patent
Lin et al.

(10) Patent No.: US 9,324,147 B2
(45) Date of Patent: Apr. 26, 2016

(54) METHOD AND APPARATUS FOR COMPUTING A PARALLAX

(75) Inventors: Sixin Lin, Guangdong (CN); Hui Yuan, Guangdong (CN); Yilin Chang, Guangdong (CN); Haitao Yang, Guangdong (CN); Xiaoxian Liu, Guangdong (CN); Junyan Huo, Guangdong (CN); Fuzheng Yang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 761 days.

(21) Appl. No.: 13/188,322

(22) Filed: Jul. 21, 2011

(65) Prior Publication Data
US 2011/0273537 A1     Nov. 10, 2011

Related U.S. Application Data

(63) Continuation of application No. PCT/CN2009/075983, filed on Dec. 24, 2009.

(30) Foreign Application Priority Data

Jan. 22, 2009 (CN) .......................... 2009 1 0005981

(51) Int. Cl.
H04N 13/00   (2006.01)
G06T 7/00    (2006.01)

(52) U.S. Cl.
CPC ............. *G06T 7/0022* (2013.01); *G06T 7/0065* (2013.01)

(58) Field of Classification Search
None
See application file for complete search history.

(56) References Cited

U.S. PATENT DOCUMENTS

| 5,719,954 | A | 2/1998 | Onda |
| 5,867,591 | A | 2/1999 | Onda |
| 6,215,899 | B1 | 4/2001 | Morimura et al. |
| 6,310,917 | B1* | 10/2001 | Omote et al. ............ 375/240.12 |
| 6,404,461 | B1* | 6/2002 | Le Clerc ..................... 348/700 |
| 7,194,126 | B2 | 3/2007 | Konolige |
| 7,272,256 | B2 | 9/2007 | Zhang et al. |
| 2001/0045979 | A1* | 11/2001 | Matsumoto et al. ............ 348/43 |
| 2002/0018062 | A1* | 2/2002 | Hamaguchi ................... 345/419 |
| 2002/0024517 | A1* | 2/2002 | Yamaguchi et al. .......... 345/424 |
| 2003/0053681 | A1* | 3/2003 | Jia ................................ 382/154 |

(Continued)

FOREIGN PATENT DOCUMENTS

| CN | 1153362 A | 7/1997 |
| CN | 101179745 A | 5/2008 |

(Continued)

OTHER PUBLICATIONS

Written Opinion of the International Searching Authority dated Apr. 1, 2010 in connection with International Patent Application No. PCT/CN2009/075983.

(Continued)

*Primary Examiner* — Frederick Bailey

(57) ABSTRACT

A method and an apparatus for computing a parallax are provided. The method includes: obtaining a plurality of views of a pixel point; computing gradients in a plurality of directions of the pixel point in the plurality of view; computing a matching error corresponding to a parallax of the pixel point according to the gradients; and computing the parallax of the current pixel point according to the matching error. Through the method and the apparatus for computing a parallax, the accuracy of parallax estimation is increased.

14 Claims, 5 Drawing Sheets

(56) References Cited

U.S. PATENT DOCUMENTS

| | | | |
|---|---|---|---|
| 2005/0100207 A1 | 5/2005 | Konolige | |
| 2006/0103732 A1* | 5/2006 | Bateman | 348/208.2 |
| 2009/0322781 A1* | 12/2009 | Letavin | G06T 15/50 345/611 |

FOREIGN PATENT DOCUMENTS

| | | |
|---|---|---|
| CN | 101262619 A | 9/2008 |
| CN | 101325725 A | 12/2008 |
| JP | 11289544 A | 10/1999 |
| WO | WO 2009/096912 A1 | 8/2009 |
| WO | WO 2009/157895 A1 | 12/2009 |

OTHER PUBLICATIONS

Translation of Office Action dated Mar. 23, 2011 in connection with Chinese Patent Application No. 200910005981.8.

Hua-jun He, et al., "Disparity estimation based on the gradient and MRF model", Journal of Xidian University, vol. 34, No. 3, Jun. 2007, 5 pages.

Sheng-rong Gong, et al., "Matched Points Purify Algorithm Based on Gradient of Disparity Constraint", Journal of System Simulation vol. 20 Suppl., Sep. 2008, p. 407-410.

International Search Report dated Apr. 1, 2010 in connection with International Patent Application No. PCT/CN2009/075983.

* cited by examiner

METHOD AND APPARATUS FOR COMPUTING A PARALLAX

CROSS-REFERENCE TO RELATED APPLICATIONS

This application is a continuation of International Application No. PCT/CN2009/075983, filed on Dec. 24, 2009, which claims priority to Chinese Patent Application No. 200910005981.8, filed on Jan. 22, 2009, both of which are hereby incorporated by reference in their entireties.

TECHNICAL FIELD

The present invention relates to the field of three-dimensional video encoding technologies, and in particular, to a method and an apparatus for computing a parallax.

BACKGROUND

In a conventional single-viewpoint television system, a view and view point of a user are decided by a three-dimensional space position and direction of a camera. Therefore, the user cannot freely select the view and viewpoint for watching. A free view television (FTV) system proposed in 2002 allows the user to freely select a view and viewpoint for watching a television, thereby providing a more vivid and real brand-new three-dimensional audio-visual system.

A key technology of the FTV is about how to acquire accurate depth information; for example, stereo matching, that is, parallax estimation is performed according to two views shot by two adjacent cameras.

In the prior art, a global optimization algorithm is applied to the parallax estimation, in which, the global optimization algorithm mainly constructs an energy model satisfying a certain constraint condition as shown in Formula (1), so that the global mismatch energy is minimal. The key of the accuracy of the parallax estimation lies in whether an energy function can accurately express an actual matching extent between corresponding pixels under different assumed parallaxes, and the smoothness between parallaxes of adjacent pixels at the same depth, that is, Edata and Esmooth in Expression (1).

$$E = E\text{data} + \lambda \times E\text{smooth}$$

$$E\text{data} = |I(x-d,y) - I^{ref}(x,y)|$$

$$E\text{smooth} = |\text{disp}(x,y) - \text{disp}(x^{neighbor}, y^{neighbor})| \quad (1)$$

In Formula (1), Edata represents a matching error in a case that a parallax of a current pixel is d, $I(x, y)$ represents a luminance value of the current pixel, and $I^{ref}(x-d, y)$ represents a luminance value of a matching pixel in a reference view when the parallax is d. The same as a matching policy of local matching, Esmooth represents an absolute difference between parallaxes of two adjacent pixels, which denotes the smoothness of the parallaxes of the adjacent pixels.

Meanwhile, in Prior Art 1, in order to increase the accuracy of the parallax estimation, Edata in Formula (1) for sub-pixel search policy computation is adopted in an FTV standardization formulation procedure.

In the implementation of the present invention, the inventors of the present invention find that, in the prior art, interpolation is performed in a horizontal direction, so that an interpolation result is not accurate enough, and further a parallax estimation result is either not accurate.

In Prior Art 2, in the 85th MPEG conference held in Hanover in July, 2008, the GIST proposed, when an error function Edata is matched, a time consistency constraint is added, that is, a time consistency constraint item is added in the expression of Edata in Formula (1), as shown in Formula (2).

$$E\text{data} = |I(x,y) - I^{ref}(x,y-d)| + C_{temp}(x,y,d)$$

$$C_{temp}(x,y,d) = \lambda \times |d - D_{prev}(x,y)| \quad (2)$$

In different matching search methods, $|I(x,y) - I^{ref}(x,y-d)|$ in Expression (2) may be replaced with other functions, which does not directly embody the time consistency constraint. $D_{prev}(x,y)$ represents a parallax of a pixel in a previous frame having the same coordinate as the coordinate of a pixel (x,y) of a current frame, $\lambda$ represents a weighting factor, $C_{temp}(x,y,d)$ is a time consistency constraint item, and d is an estimated parallax of a current pixel.

In the implementation of the present invention, the inventors of the present invention find that, in Prior Art 2, motion features are not considered for the time consistency constraint, and a uniform time consistency constraint is adopted for a motion area, so that an error occurs in the estimated parallax, that is, the accuracy is very low.

SUMMARY

Embodiments of the present invention provide a method and an apparatus for computing a parallax, which can increase accuracy of an estimated parallax.

According to an aspect, the present invention provides a method for computing a parallax, where the method includes:

obtaining a plurality of views of a pixel point;

computing gradients in a plurality of directions of the pixel point in the plurality of views;

computing a matching error corresponding to a parallax of the pixel point according to the gradients; and computing the parallax of the pixel point according to the matching error.

According to another aspect, the present invention further provides a method for computing a parallax, where the method includes:

obtaining a plurality of views of a pixel point, where the plurality of views includes a current view where the pixel point is located and a reference view of a reference pixel point corresponding to the pixel point;

performing motion detection on the pixel point in the current view;

computing a matching error corresponding to a parallax of the pixel point according to a motion detection result; and computing the parallax of the pixel point according to the matching error.

According to another aspect, the present invention further provides an apparatus for computing a parallax, where the apparatus includes:

an obtaining unit, configured to obtain a plurality of views of a pixel point;

a gradient computing unit, configured to compute gradients in a plurality of directions of the pixel point in the plurality of views;

a matching error unit, configured to compute a matching error corresponding to a parallax of the pixel point according to the gradients; and a parallax computing unit, configured to compute the parallax of the pixel point according to the matching error.

According to another aspect, the present invention further provides an apparatus for computing a parallax, where the apparatus includes:

an obtaining unit, configured to obtain a plurality of views of a pixel point, where the plurality of views includes a current view where the pixel point is located and a reference view of a reference pixel point corresponding to the pixel point;

a motion detecting unit, configured to perform motion detection on the pixel point in the current view;

a matching error unit, configured to compute a matching error corresponding to a parallax of the pixel point according to a motion detection result; and a parallax computing unit, configured to compute the parallax of the pixel point according to the matching error.

According to the embodiments of the present invention, by computing the pixel point and gradient information of an adjacent area of the reference pixel point of the pixel point, the accuracy of the parallax estimation is increased. Furthermore, whether a pixel in a view moves is analyzed, so that the time consistency of a stationary area in a synthesis view is maintained, and meanwhile a time consistency error without considering a shift of a motion area is overcome, thereby increasing the accuracy of the parallax estimation.

BRIEF DESCRIPTION OF THE DRAWINGS

To illustrate the technical solutions according to the embodiments of the present invention or in the prior art more clearly, the accompanying drawings for describing the present invention or the prior art are introduced briefly in the following. Apparently, the accompanying drawings in the following description are some embodiments of the present invention, and person of ordinary skill in the art can derive other drawings from the accompanying drawings without creative efforts.

DETAILED DESCRIPTION

The technical solutions according to the embodiments of the present invention will be clearly described in detail in the following with reference to the accompanying drawings. It is evident that the embodiments to be described are only a part of rather than all of the embodiments of the present invention. All other embodiments obtained by persons of ordinary skill in the art based on the embodiments of the present invention without creative efforts shall fall within the protection scope of the present invention.

Embodiments of the present invention provide a method and an apparatus for computing a parallax. The present invention is illustrated in detail hereinafter with reference to the accompanying drawings.

Figure 1:
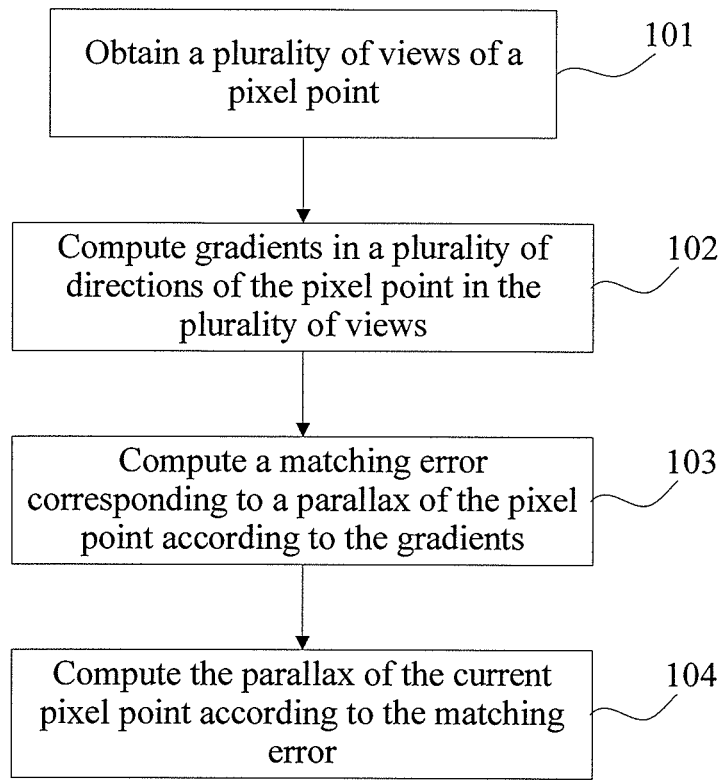
FIG. 1 is a flow chart of a method for computing a parallax for constraining pixel form consistency according to an embodiment of the present invention.

FIG. 1 is a flow chart of a method for computing a parallax for constraining pixel form consistency according to an embodiment of the present invention. The method includes the following steps:

Step 101: Obtain a plurality of views of a pixel point.

In this embodiment, the plurality of views includes a current view where the pixel point is located and a reference view of a reference pixel point corresponding to the pixel point. The number of reference views may be greater than two, and therefore in this embodiment, a current view where the pixel point is located and the reference views of the pixel point are obtained. In this embodiment, a left view, a middle view, and a right view are obtained, where the middle view is the current view, the left view and the right view are reference views of the middle view; pixel points in the left image and the right view are reference pixel points in different views for a pixel point in the middle view. In other instances, the left view or the right view may also be selected as the current view, the computation method is the same, and for ease of description, in this embodiment, the middle views is described as an embodiment.

Figure 2:
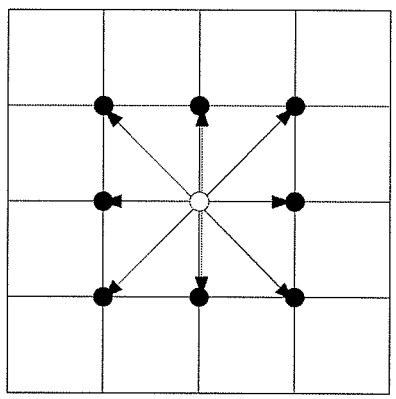
FIG. 2 is a view of gradients in eight directions of a pixel point.

Step 102: Compute gradients in a plurality of directions of the pixel point in the plurality of views. FIG. 2 is a view of gradients in eight directions of a pixel point, in which a hollow round spot is a current pixel point, and solid round spots are adjacent pixel points in eight directions of the current pixel point. A gradient is a luminance difference or a color difference between the pixel point and an adjacent pixel point of the pixel point. In this embodiment, a value of the gradient includes a luminance difference or a color difference between a pixel point in the left view, the middle view, and the right view and an adjacent pixel point of the pixel point.

For example, the gradients are computed by adopting the following expression:

$$G_i(x,y)=I(x,y)-I(x-a,y-b), i\in\{1,2,3,\ldots 8\}, a,b\in\{-1,0,1\} \quad (3)$$

where I(x, y) is a luminance or a chrominance.

Step 103: Compute a matching error corresponding to a parallax of the pixel point according to the gradients. In this embodiment, a matching error corresponding to a parallax of the pixel point in the current image relative to the reference pixel point in the reference view is computed according to the gradients.

$$Edata = \omega \times \Psi(Lum) + (1-\omega) \times \Omega(Grad) \quad (4)$$

$$\Psi(Lum) = \frac{1}{9} \times \left| \left[ \sum_{a,b\in\{-1,0,1\}} I(x-a, y-b) - \sum_{a,b\in\{-1,0,1\}} I^{ref}(x-a-d, y-b) \right] \right| \quad (5)$$

$$\Omega(Grad) = \frac{1}{8} \times \sum_{i=1}^{8} \left| G_i(x, y) - G_i^{ref}(x-d, y) \right| \quad (6)$$

In Expression (4), ω represents a weighting coefficient with a value range of (0~1); Ψ(Lum) represents an average value of absolute differences between luminance values of an area with a current pixel (x, y) as a center in the current view and luminance values of an area with a matching pixel as a center in the reference view, as shown in Expression (5); Ω(Grad) represents an average value of absolute differences between gradients in eight directions of the current pixel position and gradients in eight directions of the matching pixel in the reference view respectively, as shown in Expression (6), where $G_i^{ref}(x-d,y)$ is a gradient of the reference view.

Step 104: Compute the parallax. For example, global optimization may be performed by using a graph cut algorithm in the prior art so as to finally acquire the parallax.

As an embodiment of the present invention, before step 102, the method further includes that: upsampling is performed on the reference view in a horizontal direction, which is reduced into an estimated parallax d of the current pixel, thereby increasing the precision of searching for a pixel point.

According to the foregoing embodiment, the matching error of the pixel point may be reduced by computing gradients of a pixel point and an adjacent pixel point thereof in different images, thereby acquiring a more accurate parallax.

Figure 3:
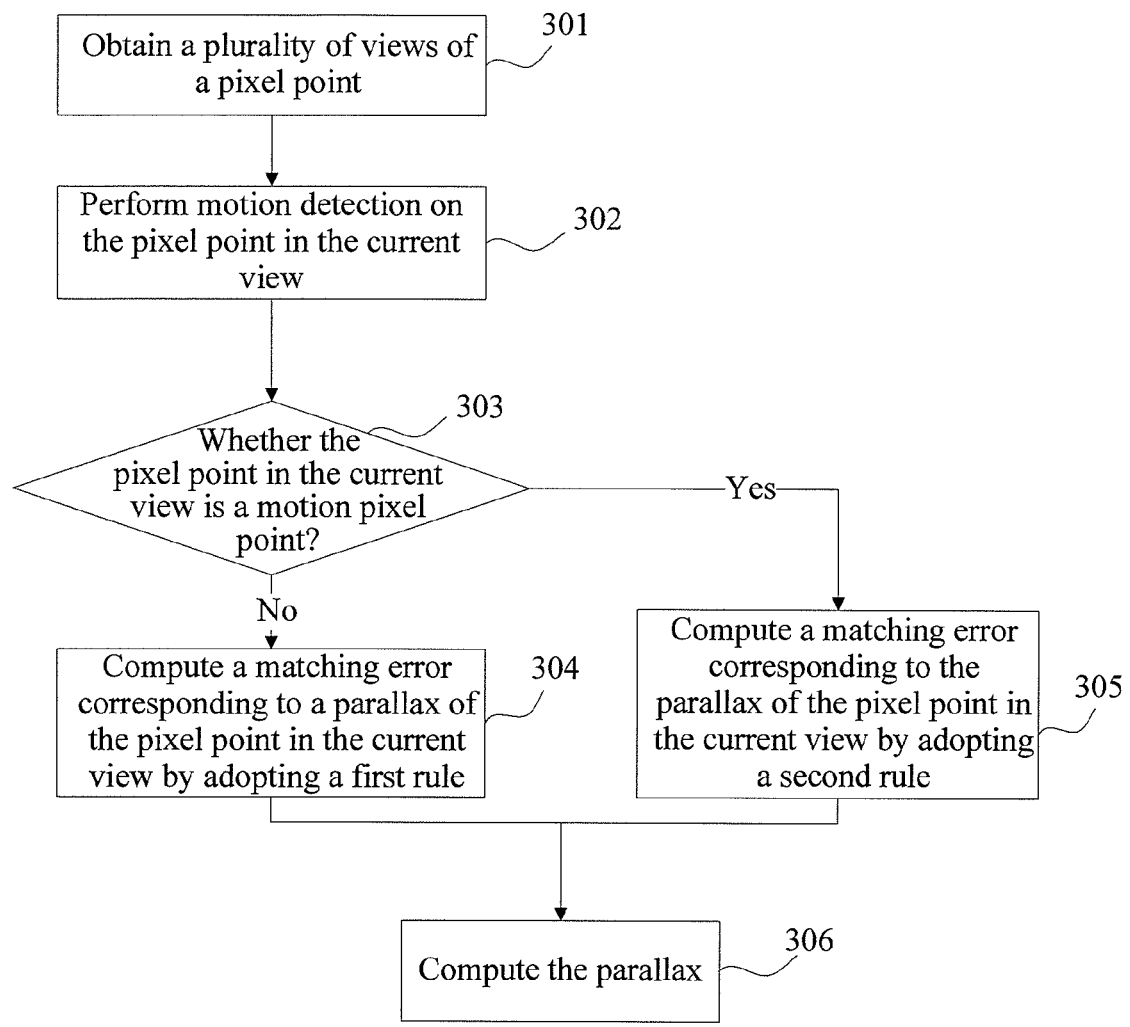
FIG. 3 is a flow chart of a method for computing a parallax for constraining time consistency of pixel motion detection according to an embodiment of the present invention.

FIG. 3 is a flow chart of a method for computing a parallax for constraining time consistency of pixel motion detection according to an embodiment of the present invention.

In all frames in a group of pictures (GOP), a relative motion area and a stationary area of a current frame relative to a previous frame are detected, and time consistency constraint is only performed on the stationary area.

The method includes the following steps:

Step 301: Obtain a plurality of views of a pixel point. In this embodiment, the plurality of views includes a current view where the pixel point is located and a reference view of a reference pixel point corresponding to the pixel point. The number of reference views may be greater than two, and therefore in this embodiment, a current image where the pixel point is located and the reference views of the pixel point are obtained. In this embodiment, a left view, a middle view, and a right view are obtained. In this embodiment, the left view and the right view are reference views of the middle view, the middle view is used as the current view, and pixel points in the left view and the right view are reference pixel points in different views of a pixel point of the middle view. In other instances, the left view or the right view may also be selected as the current view, the computation method is the same, and for ease of description, in this embodiment, the middle view is described as an embodiment.

Step 302: Perform motion detection on the pixel point in the current view. In this embodiment, the motion detection may be performed on each pixel point in the current view.

Step 303: Judge whether the pixel point in the current view is a motion pixel, and if the pixel point in the current view is a motion pixel, proceed to step 305; if the pixel point in the current view is not a motion pixel, proceed to step 304.

Step 304: Compute a matching error corresponding to a parallax of the pixel point in the current view by adopting a first rule.

Step 305: Compute the matching error corresponding to the parallax of the pixel point in the current view by adopting a second rule.

After step 304 or step 305 is completed, step 306 is performed to compute the parallax. For example, global optimization is performed by adopting the graph cut to estimate the parallax.

As an embodiment of the present invention, before step 302, the method further includes a step: Judge whether the current pixel point is a first frame in a GOP, and if the current pixel point is a first frame in a GOP, proceed to step 305; if the current pixel point is not a first frame in a GOP, proceed to step 302.

As an embodiment of the present invention, in step 302, motion detection is performed on the current pixel point and surrounding pixel points of the current pixel point, and corresponding pixel points in an adjacent frame with respect to time, and the number of the surrounding pixel points is determined according to the window size. A difference between an average value of luminances of all pixel points in a window N*N, N∈{1, 3, 5, 7, ... } with the current pixel point as a center, and an average value of luminances of pixel points of the same position area in a previous frame is computed, and if the difference is greater than a predetermined motion detection threshold TH, it is regarded that the current pixel point is a pixel point located in a motion area, and is labeled as 1; if the difference is not greater than the predetermined motion detection threshold TH, it is regarded that the current pixel point is a pixel located in a stationary area, and is labeled as 0. Each pixel in a view may be further judged, and finally a motion pixel mask is acquired so as to be conveniently used when parallaxes of other pixel points are computed.

As an embodiment of the present invention, in step 302, template matching may be further performed in a previous frame for a block where the current pixel point is located, and if the most matched block in the reference view has an offset with the current block, it is regarded that the current pixel point is located in a motion area, and finally a motion mask is acquired, and the current pixel point is labeled as 1; if the most matched block in the reference view does not have an offset with the current block, it is regarded that the current pixel point is a pixel located in a stationary area, and the current pixel point is labeled as 0.

As an embodiment of the present invention, in steps 304 and 305, the first rule is directed to a case that a pixel point does not move, the second rule is directed to a case that a pixel point moves, and the first rule and the second rule conform to the following Expression (7):

$$Edata = \omega \times |I(x, y) - I^{ref}(x, y-d)| + (1-\omega) \times C_{temp}(x, y, d) \quad (7)$$

$$C_{temp}(x, y, d) = \begin{cases} |d - D_{prev}(x, y)|, & 0 < \omega < 1 \quad \text{if } (MotionMask(x, y) = 0) \\ 0, & \omega = 1 \quad \text{if } (MotionMask(x, y) = 1) \end{cases}$$

where when Motion Mask (x, y)=0, it indicates that the current pixel point is a pixel point that does not move, that is, the first rule, and when Motion Mask (x, y)=1, it indicates that the current pixel point is a motion pixel point, that is, the second rule.

ω represents a weighting coefficient with a value range of (0~1); $|I(x,y)-I^{ref}(x,y-d)|$ in Expression (7) may be replaced with other functions, which does not directly embody the time consistency constraint; $D_{prev}(x,y)$ represents a parallax of a pixel in a previous frame having the same coordinate as the coordinate of a pixel (x,y) of a current frame, λ represents a weighting factor, and $C_{temp}(x,y,d)$ is a time consistency constraint item; d is an estimated parallax of the current pixel point.

According to the embodiment of the present invention, by distinguishing motion pixel points and non-motion pixel points in a view, for pixel points in different motion states, a parallax of a pixel point is acquired by adopting different computation rules. Compared with an approach without considering motion features in the prior art, the embodiment of the present invention can compute a parallax more accurately, which apparently improves the subjective quality and the visual effect of a video.

Figure 4:
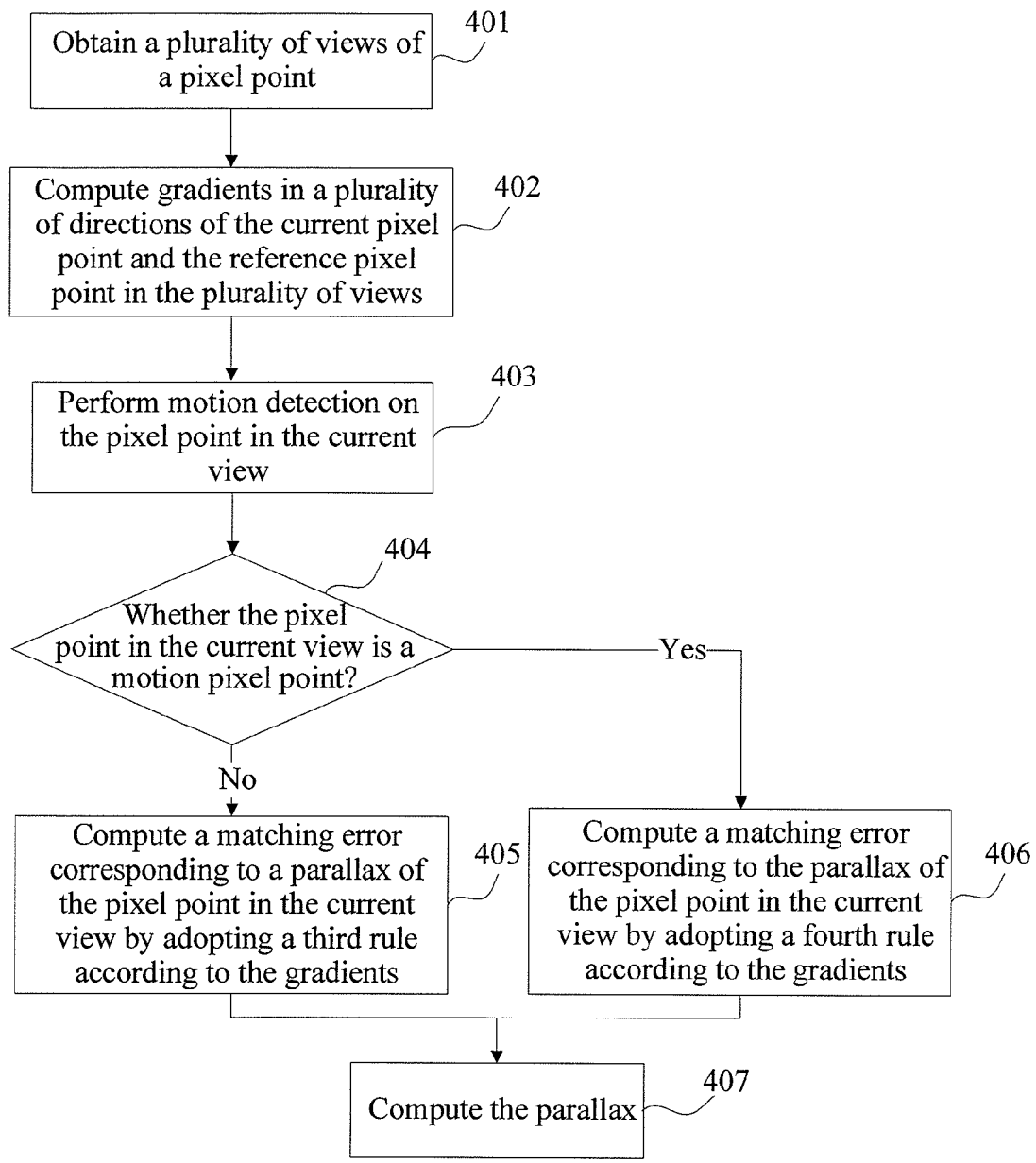
FIG. 4 is a flow chart of a method for computing a parallax for constraining pixel form consistency and time consistency of motion detection according to a first embodiment of the present invention.

FIG. 4 is a flow chart of a method for computing a parallax for constraining pixel form consistency and time consistency of motion detection according to a first embodiment of the present invention.

This embodiment is described in combination with the embodiment in FIG. 1 and the embodiment in FIG. 3. The method includes the following steps:

Step 401: Obtain a plurality of views of a pixel point. In this embodiment, the plurality of views includes a current view where the pixel point is located and a reference view of a reference pixel point corresponding to the pixel point. The number of reference views may be greater than two, and therefore in this embodiment, a current view where the pixel point is located and the reference views of the pixel point are obtained. In this embodiment, a left view, a middle view, and a right view are obtained, in which, the left view and the right view are reference views of the middle view, the middle view is used as the current view, and pixel points in the left view and the right view are reference pixel points in different views of a pixel point of the middle view.

Step 402: Compute gradients in a plurality of directions of the current pixel point in the plurality of views and gradients in a plurality of directions of the reference pixel points in the reference views.

Step 403: Perform motion detection on the pixel point in the current view.

Step 404: Judge whether the pixel point in the current view is a motion pixel, and if the pixel point in the current view is a motion pixel, proceed to step 406; the pixel point in the current view is not a motion pixel, proceed to step 405.

Step 405: Compute a matching error corresponding to a parallax of the pixel point in the current view by adopting a third rule according to the gradients.

Step 406: Compute the matching error corresponding to the parallax of the pixel point in the current view by adopting a fourth rule according to the gradients.

Step 407: Compute the parallax. For example, global optimization is performed by adopting the graph cut to estimate the parallax.

As an embodiment of the present invention, before step 402, the method further includes a step: Perform upsampling on the reference view in a horizontal direction, which is reduced into an estimated parallax d of the current pixel, thereby increasing the precision of searching for a pixel point.

As an embodiment of the present invention, before step 403, the method further includes a step: Judge whether the current pixel point is a first frame in a GOP, and if the current pixel point is a first frame in a GOP, proceed to step 406; if the current pixel point is not a first frame in a GOP, proceed to step 403.

As an embodiment of the present invention, in step 402, the plurality of directions may be eight directions for example, and gradients in eight directions of the current pixel point may be computed by adopting the following Formula (8):

$$G_i(x,y)=I(x,y)-I(x-a,y-b), i \in \{1,2,3,\ldots 8\}, a,b \in \{-1,0,1\} \quad (8)$$

where I(x, y) may be a chrominance or may be a luminance.

As an embodiment of the present invention, in step 403, a difference between an average value of luminances of all pixel points in a window N*N, N∈{1, 3, 5, 7, ...} with the current pixel point as a center, and an average value of luminances of pixel points of the same position area in a previous frame is computed, and if the difference is greater than a predetermined motion detection threshold TH, it is regarded that the current pixel point is a pixel point located in a motion area, and is labeled as 1; if the difference is not greater than the predetermined motion detection threshold, it is regarded that the current pixel point is a pixel point located in a stationary area, and is labeled as 0. Each pixel point in an image may be further judged, and finally a motion mask is acquired so as to be conveniently used when computing parallaxes of other pixel points.

As an embodiment of the present invention, in steps 405 and 406, the third rule is directed to a case that a pixel point does not move, the fourth rule is directed to a case that a pixel point moves, and the third rule and the fourth rule conform to the following Formula (9):

$$Edata = \omega_2 \times [\omega_1 \times \Psi(Lum) + (1-\omega_1) \times \Omega(Grad)] + \quad (9)$$
$$(1-\omega_2) \times C_{temp}(x,y,d)$$

$$C_{temp}(x,y,d) = \begin{cases} |d - D_{prev}(x,y)|, & 0 < \omega_2 < 1 \quad \text{if } (MotionMask(x,y) = 0) \\ 0, & \omega_2 = 1 \quad \text{if } (MotionMask(x,y) = 1) \end{cases}$$

$$\Psi(Lum) = \quad (10)$$
$$\frac{1}{9} \times \left| \sum_{a,b \in \{-1,0,1\}} I(x-a, y-b) - \sum_{a,b \in \{-1,0,1\}} I^{ref}(x-a-d, y-b) \right|$$

$$\Omega(Grad) = \frac{1}{8} \times \sum_{i=1}^{8} \left| G_i(x,y) - G_i^{ref}(x-d,y) \right| \quad (11)$$

where when Motion Mask (x, y)=0, it indicates that the current pixel point is not a motion pixel point, and when Motion Mask (x, y)=1, it indicates that the current pixel point is a motion pixel point.

$\omega_1$ and $\omega_2$ represent weighting coefficients and are acquired from experience, value ranges of both $\omega_1$ and $\omega_2$ are (0~1), and generally both $\omega_1$ and $\omega_2$ are greater than 0.5; d is an estimated parallax of the current pixel point; $\Psi(Lum)$ represents an absolute difference between an average luminance value of an area with a current pixel point (x, y) as a center in the current view and an average luminance value of an area with a reference pixel point as a center in the reference view; $\Omega(Grad)$ represents an average value of absolute differences between gradients in eight directions of the current pixel position and gradients in eight directions of the matching pixel in the reference image respectively.

As an embodiment of the present invention, the $\Psi(Lum)$ may further represent an absolute difference between an average chrominance value of an area with the current pixel point (x, y) as a center in the current view and an average chrominance value of an area with the reference pixel point as a center in the reference view.

According to the foregoing embodiment, a matching error of each pixel point may be reduced by computing gradients of a pixel point and a surrounding pixel point of the pixel point in different views, and the parallax can be computed more accurately by distinguishing motion pixel points and non-motion pixel points in a view, thereby acquiring a more accurate parallax.

Figure 5:
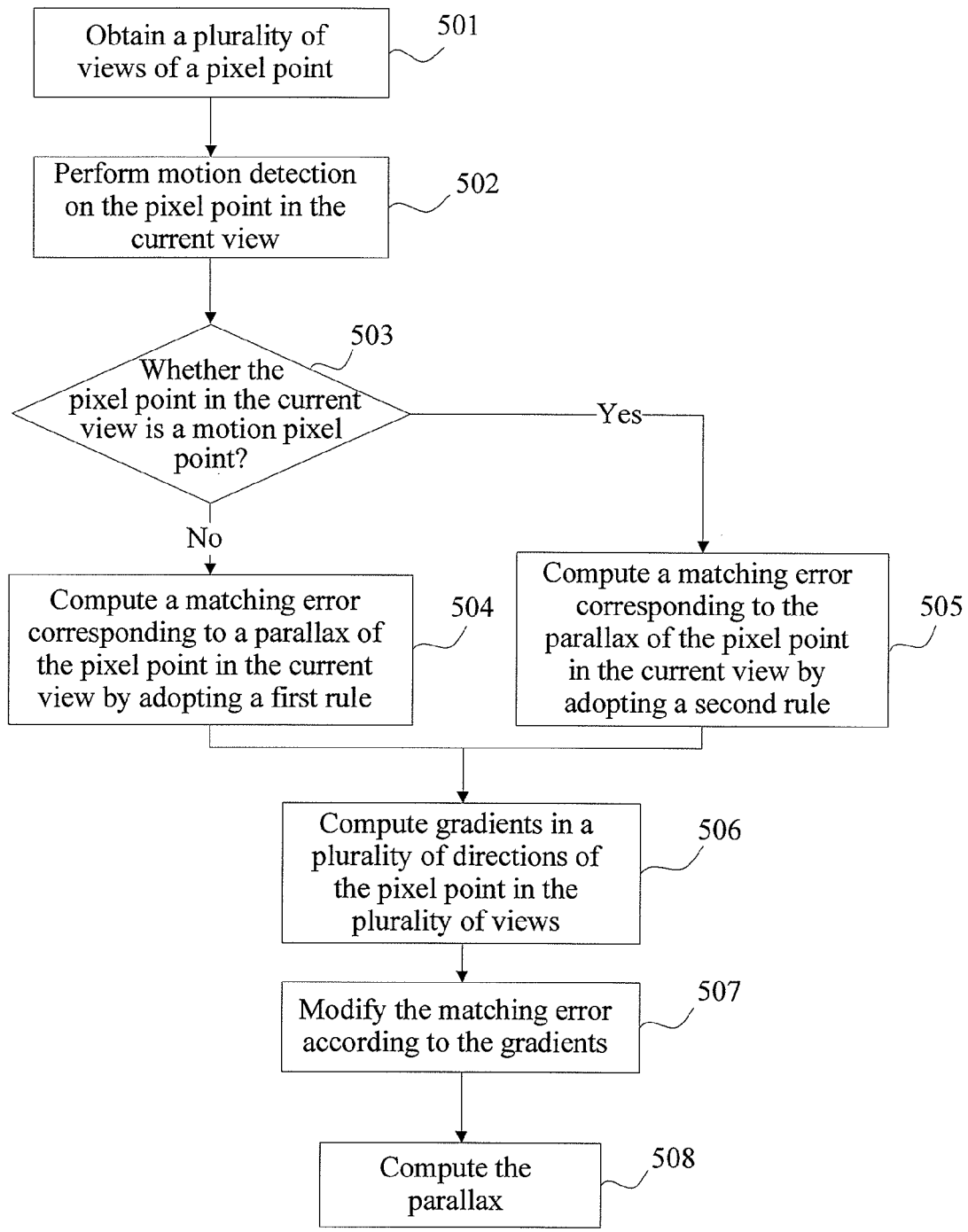
FIG. 5 is a flow chart of a method for computing a parallax for constraining pixel form consistency and time consistency of motion detection according to a second embodiment of the present invention.

FIG. 5 is a flow chart of a method for computing a parallax for constraining pixel form consistency and time consistency of motion detection according to a second embodiment of the present invention. The method includes the following steps:

Step 501: Obtain a plurality of views of a pixel point. In this embodiment, the plurality of views includes a current view where the pixel point is located and a reference view of a reference pixel point corresponding to the pixel point. The number of reference images may be greater than two, and therefore in this embodiment, a current view where the pixel point is located and the reference views of the pixel point are obtained. In this embodiment, a left view, a middle view, and a right view are obtained, in which, the left view and the right view are reference views of the middle view, and pixel points in the left view and the right view are reference pixel points in different views of a pixel point of the middle view.

Step 502: Perform motion detection on the pixel point in the current view.

Step 503: Judge whether the pixel point in the current view is a motion pixel, and if the pixel point in the current view is a motion pixel, proceed to step 505; if the pixel point in the current view is not a motion pixel, proceed to step 504.

Step 504: Compute a matching error corresponding to a parallax of the pixel point in the current image by adopting a first rule.

Step 505: Compute the matching error corresponding to the parallax of the pixel point in the current image by adopting a second rule.

Step 506: Compute gradients in a plurality of directions of the pixel point in the plurality of views.

Step 507: Modify the matching error according to the gradients.

Step 508: Compute the parallax of the pixel point.

As an embodiment of the present invention, the first rule is directed to a case that a pixel point does not move, the second rule is directed to a case that a pixel point moves, and the first rule and the second rule conform to the following Formula (12):

$$Edata_{temp} = \omega_1 \times \Psi(Lum) + (1-\omega_1) \times C_{temp}(x,y,d) \quad (12)$$
$$C_{temp}(x,y,d)] = \begin{cases} |d-D(x,y)|, & 0<\omega_1<1 \text{ if } (MotionMask(x,y)=0) \\ 0, & \omega_1=1 \text{ if } (MotionMask(x,y)=1) \end{cases}$$
$$Edata = \omega_2 \times Edata_{temp} + (1-\omega_2) \times \Omega(Grad)$$

$$\Psi(Lum) = \quad (13)$$
$$\frac{1}{9} \times \left|\left| \sum_{a,b \in \{-1,0,1\}} I(x-a, y-b) - \sum_{a,b \in \{-1,0,1\}} I^{ref}(x-a-d, y-b) \right|\right|$$

$$\Omega(Grad) = \frac{1}{8} \times \sum_{i=1}^{8} |G_i(x,y) - G_i^{ref}(x-d,y)| \quad (14)$$

where when Motion Mask (x, y)=0, it indicates that the current pixel point is not a motion pixel point, and when Motion Mask (x, y)=1, it indicates that the current pixel point is a motion pixel point.

$Edata_{temp}$ represents the matching error acquired according to the motion detection; $\omega_1$ and $\omega_2$ represent weighting coefficients and are acquired from experience, value ranges of both $\omega_1$ and $\omega_2$ are (0~1), and generally both $\omega_1$ and $\omega_2$ are greater than 0.5; d is an estimated parallax of the current pixel point; Ψ(Lum) represents an absolute difference between an average luminance value of an area with a current pixel (x, y) as a center in the current view and an average luminance value of an area with a matching pixel as a center in the reference view; Ω(Grad) represents an average value of absolute differences between gradients in eight directions of the current pixel picture and gradients in eight directions of the matching pixel in the reference view respectively; Edata represents the matching error modified according to the gradients.

Figure 6:
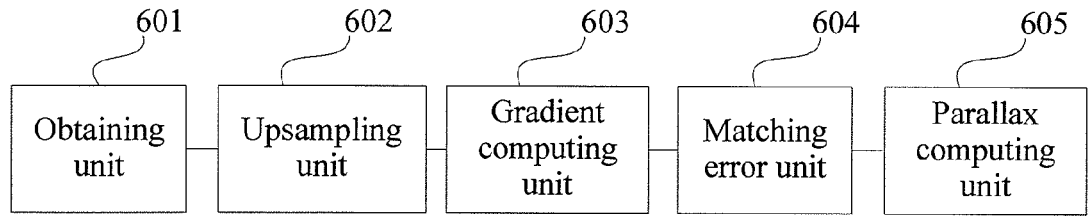
FIG. 6 is a structural view of an apparatus for computing a parallax for constraining pixel form consistency according to an embodiment of the present invention.

FIG. 6 is a structural view of an apparatus for computing a parallax for constraining pixel form consistency according to an embodiment of the present invention.

The device includes an obtaining unit 601, a gradient computing unit 603, a matching error unit 604, and a parallax computing unit 605.

The obtaining unit 601 is configured to obtain a plurality of views of a pixel point. In this embodiment, the plurality of views includes a current view where the pixel point is located and a reference view of a reference pixel point corresponding to the pixel point. The number of reference views may be greater than two, and therefore in this embodiment, a current view where the pixel point is located and the reference views of the pixel point are obtained. In this embodiment, a left view, a middle view, and a right view are obtained, in which, the left view and the right view are reference views of the middle view, and pixel points in the left view and the right view are reference pixel points in different views of a current pixel point of the middle view.

The gradient computing unit 603 is configured to compute gradients in a plurality of directions of the pixel point in the plurality of views.

For example, the gradients are computed by adopting the following formula:

$$G_i(x,y)=I(x,y)-I(x-a,y-b), i \in \{1,2,3,\ldots 8\}, a,b \in \{-1,0,1\} \quad (3)$$

The matching error unit 604 is configured to compute a matching error corresponding to a parallax of the pixel point in the current view relative to the reference pixel point of the reference view according to the gradients.

The matching error unit 604 computes the matching error according to the following formulas:

$$Edata = \omega \times \Psi(Lum) + (1-\omega) \times \Omega(Grad) \quad (4)$$

$$\Psi(Lum) = \quad (5)$$
$$\frac{1}{9} \times \left|\left| \sum_{a,b \in \{-1,0,1\}} I(x-a, y-b) - \sum_{a,b \in \{-1,0,1\}} I^{ref}(x-a-d, y-b) \right|\right|$$

$$\Omega(Grad) = \frac{1}{8} \times \sum_{i=1}^{8} |G_i(x,y) - G_i^{ref}(x-d,y)| \quad (6)$$

where in Formula (4), ω represents a weighting coefficient with a value range of (0~1); Ψ(Lum) represents an absolute difference between an average luminance value of an area with a current pixel (x, y) as a center in the current view and an average luminance value of an area with a matching pixel as a center in the reference view, as shown in Formula (5); Ω(Grad) represents an average value of absolute differences between gradients in eight directions of the current pixel position and gradients in eight directions of the matching pixel in the reference image respectively, as shown in Formula (6).

The parallax computing unit 605 is configured to compute the parallax according to the matching error output by the matching error unit 604. For example, global optimization may be performed by using a graph cut algorithm so as to finally acquire the parallax.

As an embodiment of the present invention, the device further includes an upsampling unit 602, configured to perform upsampling in a horizontal direction on the reference view, thereby increasing the precision of searching for a pixel point.

Figure 7:
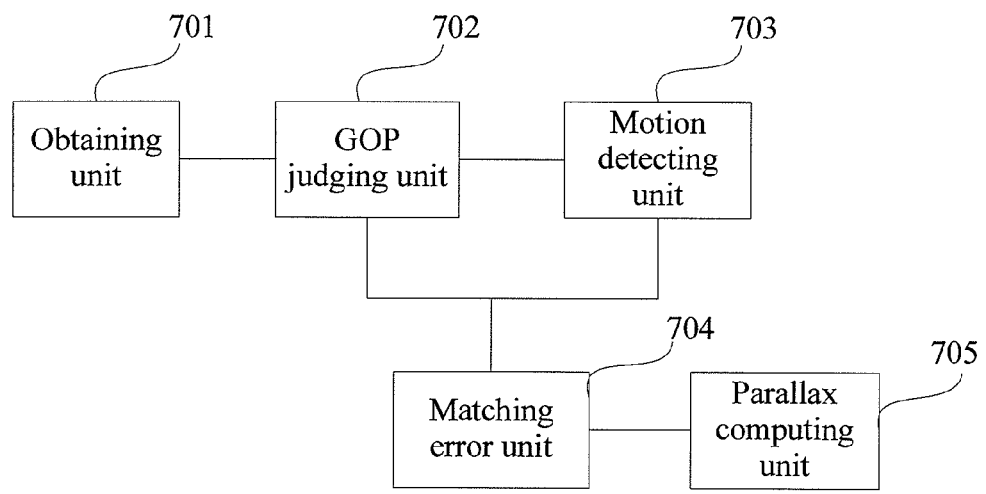
FIG. 7 is a structural view of an apparatus for computing a parallax for constraining time consistency of pixel motion detection according to an embodiment of the present invention.

FIG. 7 is a structural view of an embodiment of an apparatus for computing a parallax for constraining time consistency of pixel motion detection according to the present invention.

The apparatus includes an obtaining unit 701, a motion detecting unit 703, a matching error unit 704, and a parallax computing unit 705.

The obtaining unit 701 is configured to obtain a plurality of images of a pixel point. In this embodiment, the plurality of views includes a current view where the pixel point is located and a reference view of a reference pixel point corresponding to the pixel point. The number of reference views may be greater than two, and therefore in this embodiment, a current view where the pixel point is located and the reference images of the pixel point are obtained. In this embodiment, a left view, a middle view, and a right view are obtained, in which, the left view and the right view are reference views of the middle view, and pixel points in the left view and the right view are reference pixel points in different views of a current pixel point of the middle view.

The motion detecting unit 703 is configured to perform motion detection on the pixel point of the current view.

The matching error unit 704 is configured to compute a matching error according to data output by the motion detecting unit 703.

If the pixel point is not a motion pixel point, a matching error corresponding to a parallax of each pixel point is computed by adopting a first rule.

If the pixel point is a motion pixel point, the matching error corresponding to the parallax of each pixel point is computed by adopting a second rule.

The first rule and the second rule conform to the following Formula (7):

$$Edata = \omega \times |I(x, y) - I^{ref}(x, y - d)| + (1 - \omega) \times C_{temp}(x, y, d) \quad (7)$$

$$C_{temp}(x, y, d) = \begin{cases} |d - D_{prev}(x, y)|, & 0 < \omega < 1 \quad \text{if } (MotionMask(x, y) = 0) \\ 0, & \omega = 1 \quad \text{if } (MotionMask(x, y) = 1) \end{cases}$$

where when Motion Mask (x, y)=0, it indicates that the current pixel point is not a motion pixel point, and when Motion Mask (x, y)=1, it indicates that the current pixel point is a motion pixel point.

$\omega$ represents a weighting coefficient with a value range of (0~1); $|I(x,y)-I^{ref}(x,y-d)|$ in Formula (7) may be replaced with other functions, which does not directly embody the time consistency constraint; $D_{prev}(x,y)$ represents a parallax of a pixel in a previous frame having the same coordinate as that of a pixel (x,y) of a current frame, $\lambda$ represents a weighting factor, and $C_{temp}(x,y,d)$ is a time consistency constraint item; d is an estimated parallax of the current pixel point.

The parallax computing unit 705 is configured to compute the parallax according to the matching error output by the matching error unit 704.

As an embodiment of the present invention, the apparatus further includes a GOP judging unit 702. The GOP judging unit 702 is configured to judge whether the current pixel point is a first frame in a GOP, and if the current pixel point is a first frame in a GOP, the matching error unit 704 computes the matching error of the pixel point by adopting the second rule; if the current pixel point is not a first frame in a GOP, the motion detecting unit 703 performs motion detection on the pixel point.

Figure 8:
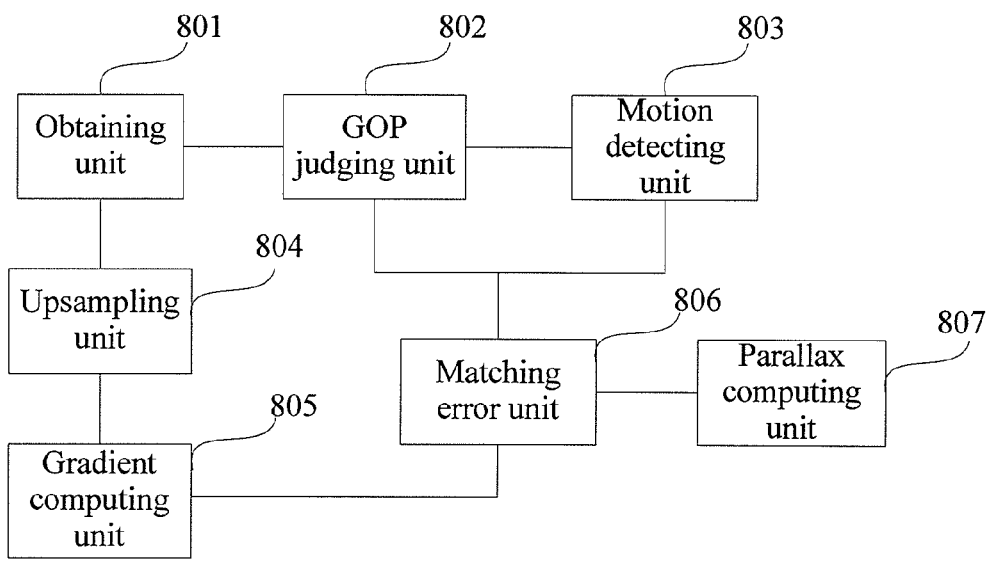
FIG. 8 is a structural view of an apparatus for computing a parallax for constraining pixel form consistency and time consistency of motion detection according to an embodiment of the present invention.

FIG. 8 is a structural view of an apparatus for computing a parallax for constraining pixel form consistency and time consistency of motion detection according to an embodiment of the present invention.

The apparatus includes an obtaining unit 801, a motion detecting unit 803, a gradient computing unit 805, a matching error unit 806, and a parallax computing unit 807.

The obtaining unit 801 is configured to obtain a plurality of views of a pixel point. In this embodiment, the plurality of views includes a current view where the pixel point is located and a reference view of a reference pixel point corresponding to the pixel point. The number of reference views may be greater than two, and therefore in this embodiment, a current view where the pixel point is located and the reference views of the pixel point are obtained. In this embodiment, a left view, a middle view, and a right view are obtained, in which, the left view and the right view are reference views of the middle view, and pixel points in the left view and the right view are reference pixel points in different views of a current pixel point of the middle view.

The motion detecting unit 803 is configured to perform motion detection on the pixel point in the current image.

The gradient computing unit 805 is configured to compute a matching error corresponding to a parallax of the pixel point in the current view relative to the reference pixel point of the reference view according to the gradients.

The matching error unit 806 is configured to compute the matching error according to data output by the motion detecting unit 803 and the gradient computing unit 805. In this embodiment, the matching error unit 806 may compute the matching error corresponding to the parallax of the current pixel point by adopting a third rule according to the gradients of the current pixel point when the pixel point is not a motion pixel point; and compute the matching error corresponding to the parallax of the current pixel point by adopting a fourth rule when the current pixel point is a motion pixel point, that is, the matching error unit 806 is configured to compute the matching error corresponding to the parallax of the pixel point according to the gradients by referring to the detection result.

The third rule and the fourth rule conform to the following Formula (9):

$$Edata = \omega_2 \times [\omega_1 \times \Psi(Lum) + (1 - \omega_1) \times \Omega(Grad)] + \quad (9)$$
$$(1 - \omega_2) \times C_{temp}(x, y, d)$$

$$C_{temp}(x, y, d) =$$
$$\begin{cases} |d - D_{prev}(x, y)|, & 0 < \omega_2 < 1 \quad \text{if } (MotionMask(x, y) = 0) \\ 0, & \omega_2 = 1 \quad \text{if } (MotionMask(x, y) = 1) \end{cases}$$

$$\Psi(Lum) = \quad (10)$$
$$\frac{1}{9} \times \left| \left[ \sum_{a,b \in \{-1,0,1\}} I(x-a, y-b) - \sum_{a,b \in \{-1,0,1\}} I^{ref}(x-a-d, y-b) \right] \right|$$

$$\Omega(Grad) = \frac{1}{8} \times \sum_{i=1}^{8} \left| G_i(x, y) - G_i^{ref}(x - d, y) \right| \quad (11)$$

where when Motion Mask (x, y)=0, it indicates that the current pixel point is not a motion pixel point, and when Motion Mask (x, y)=1, it indicates that the current pixel point is a motion pixel point.

$\omega_1$ and $\omega_2$ represent weighting coefficients and are acquired from experience, value ranges of both $\omega_1$ and $\omega_2$ are (0~1), and generally both $\omega_1$ and $\omega_2$ are greater than 0.5; d is an estimated parallax of the current pixel point; $\Psi(Lum)$ represents an absolute difference between an average luminance value of an area with a current pixel (x, y) as a center in the current view and an average luminance value of an area with a matching pixel as a center in the reference view; Ω(Grad) represents an average value of absolute differences between gradients in eight directions of the current pixel position and gradients in eight directions of the matching pixel in the reference view respectively.

In this embodiment, the matching error unit 806 may further compute the matching error according to the detection result of the motion detecting unit 806 firstly, that is, compute the matching error corresponding to the parallax of the pixel point in the current view by adopting a first rule when the pixel point is a motion pixel, and compute the matching error corresponding to the parallax of the pixel point in the current view by adopting a second rule when the pixel point is not a motion pixel. Then, the matching error is modified according to the gradients output by the gradient computing unit 805.

As an embodiment of the present invention, the first rule and the second rule conform to the following Formula (12):

$$Edata_{temp} = \omega_1 \times \Psi(Lum) + (1 - \omega_1) \times C_{temp}(x, y, d) \quad (12)$$

$$C_{temp}(x, y, d) = \begin{cases} |d - D(x, y)|, & 0 < \omega_1 < 1 \text{ if } (MotionMask(x, y) = 0) \\ 0, & \omega_1 = 1 \text{ if } (MotionMask(x, y) = 1) \end{cases}$$

$$Edata = \omega_2 \times Edata_{temp} + (1 - \omega_2) \times \Omega(Grad)$$

$$\Psi(Lum) = \quad (13)$$
$$\frac{1}{9} \times \left| \left[ \sum_{a,b \in \{-1,0,1\}} I(x-a, y-b) - \sum_{a,b \in \{-1,0,1\}} I^{ref}(x-a-d, y-b) \right] \right|$$

$$\Omega(Grad) = \frac{1}{8} \times \sum_{i=1}^{8} |G_i(x, y) - G_i^{ref}(x-d, y)| \quad (14)$$

where when Motion Mask (x, y)=0, it indicates that the current pixel point is not a motion pixel point, and when Motion Mask (x, y)=1, it indicates that the current pixel point is a motion pixel point.

$Edata_{temp}$ represents the matching error acquired according to the motion detection; $\omega_1$ and $\omega_2$ represent weighting coefficients and are acquired from experience, value ranges of both $\omega_1$ and $\omega_2$ are (0~1), and generally both $\omega_1$ and $\omega_2$ are greater than 0.5; d is an estimated parallax of the current pixel point; $\Psi(Lum)$ represents an absolute difference between an average luminance value of an area with a current pixel (x, y) as a center in the current view and an average luminance value of an area with a matching pixel as a center in the reference view; $\Omega(Grad)$ represents an average value of absolute differences between gradients in eight directions of the current pixel position and gradients in eight directions of the matching pixel in the reference view respectively; Edata represents the matching error modified according to the gradients, that is, the final matching error output by the matching error unit 806.

The $\Psi(Lum)$ may further represent an absolute difference between an average chrominance value of an area with a current pixel point (x, y) as a center in the current view and an average chrominance value of an area with a reference pixel point as a center in the reference view.

The parallax computing unit 807 is configured to compute the parallax according to the matching error output by the matching error unit 806.

As an embodiment of the present invention, the apparatus further includes a GOP judging unit 802, configured to judge whether the current pixel point is a first frame in a GOP, and if the current pixel point is a first frame in a GOP, the matching error unit 806 computes the matching error of the pixel point by adopting the second rule; if the current pixel point is not a first frame in a GOP, the motion detecting unit 803 performs motion detection on the pixel point.

As an embodiment of the present invention, the apparatus further includes an upsampling unit 804, configured to perform upsampling in a horizontal direction on the reference image, thereby increasing the precision of searching for a pixel point.

The beneficial effects of the embodiments of the present invention lie in that, according to the embodiments of the present invention, whether a pixel in an image moves is analyzed, so that the time consistency of a stationary area in a synthesis image is maintained, and meanwhile a time consistency error without considering a shift of a motion area is overcome; the space consistency of a motion area relative to an edge of a stationary area, and particularly the good space consistency of a moving object relative to an edge of a stationary object are ensured; the synthesis picture quality of the motion area is increased.

According to the embodiments of the present invention, by computing the gradients of the current pixel point and the reference pixel point, that is, using the form consistency, not only the accuracy of the parallax estimation is increased, but also the time consistency between a depth image and a synthesis image is increased simultaneously, and particularly, correct edges of an object are effectively maintained, thereby apparently improving the subjective quality and the visual effect of a video. The depth of a planar area is also made smoother.

Compared with the method for sub-pix parallax estimation only using the luminance as the measure, about 0.3 dB is increased in the method for parallax estimation adopting the combined measures of the form, the luminance, and the motion feature according to the present invention.

Persons having ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, an optical disk, a read-only memory (ROM), or a random access memory (RAM).

The objectives, technical solutions, and beneficial effects of the present invention have been illustrated in further detail through the above specific embodiments. It should be understood that the above descriptions are merely specific embodiments of the present invention, but not intended to limit the scope of the present invention. Any modification, equivalent replacements, or improvements made without departing from the spirit and principle of the present invention should fall within the protection scope of the present invention.

What is claimed is:

1. A method for electronically computing a parallax, the method comprising:
    obtaining a plurality of views of a pixel point, wherein the plurality of views comprises a current view where the pixel point is located and a reference view of a reference pixel point corresponding to the pixel point;
    computing gradients in a plurality of directions of the pixel point in the plurality of views;
    computing a matching error of the pixel point in the plurality of views;

modifying the matching error according to an average value of absolute differences between gradients of the pixel point and gradients in a plurality of directions of a matching pixel in the reference view; and computing a parallax of the pixel point according to the modified matching error.

2. The method according to claim 1, wherein each gradient is a luminance difference or a color difference between the pixel point and an adjacent pixel point of the pixel point.

3. The method according to claim 1, wherein computing the gradients in the plurality of directions of the pixel point in the plurality of views comprises: computing gradients in eight directions of the pixel point in the plurality of views.

4. The method according to claim 1, wherein computing the matching error of the pixel point comprises:

computing the matching error of the pixel point in the current view relative to the reference pixel point in the reference view according to the gradients.

5. The method according to claim 1, wherein after computing the gradients in the plurality of directions of the pixel point in the plurality of views, the method comprises:

performing motion detection on the pixel point in the current view, so as to acquire a detection result; and computing the matching error of the pixel point comprises: computing the matching error of the pixel point by referring to the detection result.

6. The method according to claim 5, wherein performing the motion detection on the pixel point in the current view comprises:

computing a difference between an average value of luminances of all pixel points in a window N*N, N∈{1, 3, 5, 7, ... } with the pixel point as a center, and an average value of luminances of pixel points of the same position area in an adjacent frame with respect to time;

if the difference is greater than a predetermined motion detection threshold, judging that the pixel point is a motion pixel point; and if the difference is not greater than a predetermined motion detection threshold, judging that the pixel point is a stationary pixel point.

7. A method for electronically computing a parallax, the method comprising:

obtaining a plurality of views of a pixel point, wherein the plurality of views comprises a current view where the pixel point is located and a reference view of a reference pixel point corresponding to the pixel point;

performing motion detection on the pixel point in the current view and creating a motion detection result;

computing a matching error of the pixel point according to the motion detection result;

computing gradients in a plurality of directions of the pixel point in the plurality of views;

modifying the matching error according to an average value of absolute differences between gradients of the pixel point and gradients in a plurality of directions of a matching pixel in the reference view; and computing a parallax of the pixel point according to the modified matching error.

8. The method according to claim 7, wherein performing the motion detection on the pixel point in the current view comprises:

computing a difference between an average value of luminances of all pixel points in a window N*N, N∈{1, 3, 5, 7, ... } with the pixel point as a center, and an average value of luminances of pixel points of the same position area in an adjacent frame with respect to time;

if the difference is greater than a predetermined motion detection threshold, judging that the pixel point is a motion pixel point; and if the difference is not greater than a predetermined motion detection threshold, judging that the pixel point is a stationary pixel point.

9. The method according to claim 7, wherein before performing the motion detection on the pixel point in the current view, the method further comprises:

computing the matching error of the pixel point if the pixel point is a first frame in a group of pictures (GOP), or performing the motion detection on the pixel point if the pixel point is not a first frame in a GOP.

10. An apparatus for computing a parallax, the apparatus comprising:

circuitry configured to obtain a plurality of views of a pixel point, wherein the plurality of views comprises a current view where the pixel point is located and a reference view of a reference pixel point corresponding to the pixel point;

circuitry configured to compute gradients in a plurality of directions of the pixel point in the plurality of views;

circuitry configured to compute a matching error of the pixel point and a modified matching error according to an average value of absolute differences between gradients of the pixel point and gradients in a plurality of directions of a matching pixel in the reference view; and circuitry configured to compute a parallax of the pixel point according to the modified matching error.

11. The apparatus according to claim 10, wherein the apparatus further comprises:

circuitry configured to perform motion detection on the pixel point in the current view and provide a detection result; and circuitry configured to compute the matching according to the gradients by referring to the detection result.

12. An apparatus for computing a parallax, the apparatus comprising:

circuitry configured to obtain a plurality of views of a pixel point, wherein the plurality of views comprises a current view where the pixel point is located and a reference view of a reference pixel point corresponding to the pixel point;

circuitry configured to compute gradients in a plurality of directions of the pixel point in the plurality of views;

circuitry configured to perform motion detection on the pixel point in the current view and create a motion detection result;

circuitry configured to compute a matching error according to the motion detection result, and configured to modify the matching error according to an average value of absolute differences between gradients of the pixel point and gradients in a plurality of directions of a matching pixel in the reference view; and circuitry configured to compute a parallax of the pixel point according to the modified matching error.

13. The apparatus according to claim 12, comprising:

circuitry configured to judge whether the pixel point in the current view is a first frame in a GOP, wherein:

if the pixel point is a first frame in a GOP, the circuitry computes the matching error of the pixel point;

if the pixel point is not a first frame in a GOP, the circuitry performs the motion detection on the pixel point.

14. The apparatus according to claim 12, wherein the motion detection comprises:

computing a difference between an average value of luminances of all pixel points in a window N*N, N∈{1, 3, 5, 7, . . . } with the pixel point as a center, and an average value of luminances of pixel points of the same position area of an adjacent frame with respect to time;

if the difference is greater than a predetermined motion detection threshold, judging that the pixel point is a motion pixel point; and if the difference is not greater than a predetermined motion detection threshold, judging that the pixel point is a stationary pixel point.

* * * * *